United States Patent
Shetty

(10) Patent No.: US 12,093,017 B2
(45) Date of Patent: Sep. 17, 2024

(54) MALICIOUS OBJECT DETECTION IN 3D PRINTER DEVICE MANAGEMENT

(71) Applicant: VMware LLC, Palo Alto, CA (US)

(72) Inventor: Rohit Pradeep Shetty, Bangalore (IN)

(73) Assignee: Omnissa, LLC, Palo Alto, CA (US)

( * ) Notice: Subject to any disclaimer, the term of this patent is extended or adjusted under 35 U.S.C. 154(b) by 174 days.

(21) Appl. No.: 17/012,248

(22) Filed: Sep. 4, 2020

(65) Prior Publication Data

US 2022/0011743 A1    Jan. 13, 2022

(30) Foreign Application Priority Data

Jul. 8, 2020  (IN) .............................. 202041029020

(51) Int. Cl.
  *G05B 19/4099*   (2006.01)
  *G06F 16/22*    (2019.01)
  (Continued)

(52) U.S. Cl.
  CPC ..... *G05B 19/4099* (2013.01); *G06F 16/2282* (2019.01); *G06F 16/5854* (2019.01); *G06F 30/27* (2020.01)

(58) Field of Classification Search
  CPC ............. G05B 19/4099; G06F 16/2282; G06F 16/5854; G06F 30/27; G06F 3/1203;
  (Continued)

(56) References Cited

U.S. PATENT DOCUMENTS

| 2013/0166282 | A1* | 6/2013 | Ridge | ..................... G06F 40/30 704/9 |
| 2014/0040979 | A1* | 2/2014 | Barton | .................. H04W 12/30 726/1 |

(Continued)

FOREIGN PATENT DOCUMENTS

| JP | 2013218455 | A | * | 10/2013 | |
| JP | 2017173914 | A | * | 9/2017 | |
| WO | WO-2020054612 | A1 | * | 3/2020 | ............. B60R 9/045 |

OTHER PUBLICATIONS

Mack, E. , "(Jun. 11, 2018) What is whitelisting and how should you implement it?", Springboard Blog, Retrieved Jul. 6, 2022, from https://www.springboard.com/blog/cybersecurity/what-is-whitelisting/ (Year: 2018).

*Primary Examiner* — Thomas C Lee
*Assistant Examiner* — Michael Tang
(74) *Attorney, Agent, or Firm* — Kim & Stewart LLP

(57) ABSTRACT

Systems and methods for 3D printer management can allow or reject printing of an object based on a model that is trained with machine learning. In one example, the model classifies the object according to object type. The object type can be compared against a list to determine whether to block the object from printing. The object can also be compared to previously printed objects. The object can be blocked from printing if a combination of the object and a previously printed object amounts to a threshold amount of a black-listed item. The lists can be specific to users, such as an organizational group to which the user belongs. A print server can apply the model prior to forwarding the object to a 3D printer for printing. Both the models and the lists can evolve based on machine learning, such as based on which print decisions receive override from administrators.

20 Claims, 5 Drawing Sheets

(51) Int. Cl.
*G06F 16/583* (2019.01)
*G06F 30/27* (2020.01)

(58) Field of Classification Search
CPC .... G06F 3/1219; G06F 3/1239; G06F 3/1273;
G06F 3/129; G06F 21/562; G06N 3/0454;
G06N 3/08; G06V 2201/10; Y02P 90/02;
G06K 9/6274; B33Y 50/00
USPC ...................................... 700/118; 726/21, 27
See application file for complete search history.

(56) References Cited

U.S. PATENT DOCUMENTS

| | | | |
|---|---|---|---|
| 2014/0058959 A1* | 2/2014 | Isbjornssund | B33Y 50/00 |
| | | | 705/310 |
| 2014/0283104 A1* | 9/2014 | Nilsson | G06F 21/10 |
| | | | 726/26 |
| 2015/0036174 A1* | 2/2015 | Pettis | G06F 3/1288 |
| | | | 358/1.15 |
| 2015/0165685 A1* | 6/2015 | Klappert | B29C 64/386 |
| | | | 700/98 |
| 2016/0042255 A1* | 2/2016 | Ganesh | G06K 15/02 |
| | | | 358/1.15 |
| 2017/0218660 A1* | 8/2017 | Muchna | E05B 47/026 |
| 2017/0305067 A1* | 10/2017 | Cortes | B29C 64/153 |
| 2017/0308339 A1* | 10/2017 | Yamazaki | G06F 3/1285 |
| 2018/0004463 A1* | 1/2018 | Masumoto | G06F 3/1222 |
| 2019/0325436 A1* | 10/2019 | Cheng | H04L 9/50 |
| 2020/0269511 A1* | 8/2020 | Vasil | H04L 9/50 |
| 2020/0326683 A1 | 10/2020 | Oligschlaeger | |
| 2022/0215386 A1* | 7/2022 | Yonekura | G06Q 20/38215 |

* cited by examiner

MALICIOUS OBJECT DETECTION IN 3D PRINTER DEVICE MANAGEMENT

RELATED APPLICATIONS

Benefit is claimed under 35 U.S.C. 119(a)-(d) to Foreign Application Serial No. 202041029020 filed in India entitled "MALICIOUS OBJECT DETECTION IN 3D PRINTER DEVICE MANAGEMENT", on Jul. 8, 2020, by VMware, Inc., which is herein incorporated in its entirety by reference for all purposes.

BACKGROUND

Three-dimensional ("3D") printers are increasingly prevalent within enterprise environments. Workers can use 3D printers to print objects as part of their job. For example, 3D printing can speed the process of product development by allowing workers to print multiple prototypes in a short amount of time. Printed prototypes can be tested and workers can change the object until an optimal design is reached. The object itself can be, for example, a computer-aided design ("CAD") file, an STL file, an OBJ file, or some other file type that describes 3D shape information (e.g., geometry) and is recognized by 3D printers.

However, problems can arise when workers print objects that are less directly related to their job. For example, workers can print any unrelated object, using up limited extrusion materials that an enterprise may have available. The printed objects themselves can be distracting. Instead of performing job tasks, workers can waste time designing toys to print as cubicle decorations.

More seriously, workers can also 3D print potentially offensive or harmful items. For example, objects that resemble or act as weapons can be 3D printed at the workplace. Objects resembling knives or firearms can pose security risks. Crude items can make some employees uncomfortable.

While some methods exist for detecting potentially offensive or harmful items, a worker can often bypass these security features by printing components of such an item individually and then assembling them. These components can appear completely innocuous when viewed individually, and in some cases can closely resemble parts often printed in workplace. There currently is no way to determine that a dangerous object is being assembled from otherwise innocuous parts.

As a result, a need exists for improved systems to manage 3D printers that can.

SUMMARY

Examples described herein include systems and methods for managing the printing of 3D objects in an enterprise. In one example, a print server can receive a print request from a user device. The print request can include an object for 3D printing. The print request can also identify the user device making the request. The print server can be a separate device from the 3D printer or can execute virtually using a processor of the 3D printer, in different examples.

An agent executing on the print server or 3D printer can apply a model to the object to determine a classification. The classification can represent an object type, such as a "gear" or a "ball." The model can be pre-trained to output these classifications through application of machine learning algorithms. For example, a training process can analyze one or more databases of objects. The objects in those databases can include metadata that identifies a corresponding object type, allowing training processes to build a model that outputs an object type classification. When the model is applied to the object, the model can utilize shape information of the object, as well as metadata, to determine the appropriate classification.

The agent can also apply a model to compare the object, or its classification, to previously printed objects. The comparison can determine whether any combination of objects amounts to a threshold amount of a classified item. The combination can be determined from a single user or from a collection of users who are related. For example, users who work together can be associated and their printed items can be combined for comparison against a classification database or through use of a trained classification model.

The agent can then use the classification and object combination comparison to determine whether to allow the print request. In one example, the agent does so by comparing the classification against a list, such as a whitelist or a blacklist. A whitelist can include object classifications that are allowed, for example. A blacklist can include object classifications that are disallowed. If the list comparison reveals that the object is allowed (or not disallowed), then the object can print at the 3D printer.

In one example, different lists can apply to different organizational groups. The user device can be associated with one or more of the organizational groups. This can allow an enterprise to distinguish who can print which types of objects. Such distinctions can save printer usage and ensure productive use of the 3D printers. The group-specific lists can be sent to a printer or print server from a management server. The management server can track which object types are allowed for which groups. As the lists are updated, new lists can be proliferated from the management server to the print server or the 3D printers.

If a print request is denied, an alert can be sent to an administrator. This can be an email or text, in an example. The alert can identify the classification of the object or object combination. The alert can also identify the object itself, in an example, such as by providing a link to the object. This can allow the administrator to investigate potential issues with regard to what employees are attempting to print.

These stages can be performed by physical devices that execute an agent, in an example. For example, the stages can be part of a system that includes a print server that executes the agent to apply the models. Alternatively, a 3D printer can execute an agent and perform some or all of the print server functionality. The agent can communicate with servers to apply the models, in an example. Alternatively, a non-transitory, computer-readable medium including instructions can cause a processor at the printer or print server to perform the stages when the processor executes the instructions. The term "agent" can broadly refer to any process executing on a physical device for performing the managed printing functionality.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a print server can receive a request to print an object at a 3D printer. An agent on the printer can apply a model to the object. The model can classify the object according to object type. The object type can be compared against a list, such as a whitelist or blacklist, to determine whether to block the object from printing. The object can also be compared to previously printed objects. The object can be blocked from printing if a combination of the object and previously printed objects amounts to a threshold amount of a blacklisted item. The lists can be specific to users, such as based on an organizational group to which the user belongs. The print server can apply the model prior to forwarding the object to a 3D printer for printing. Both the models and the lists can evolve based on machine learning, such as based on which print decisions receive an override from administrators.

Figure 1:
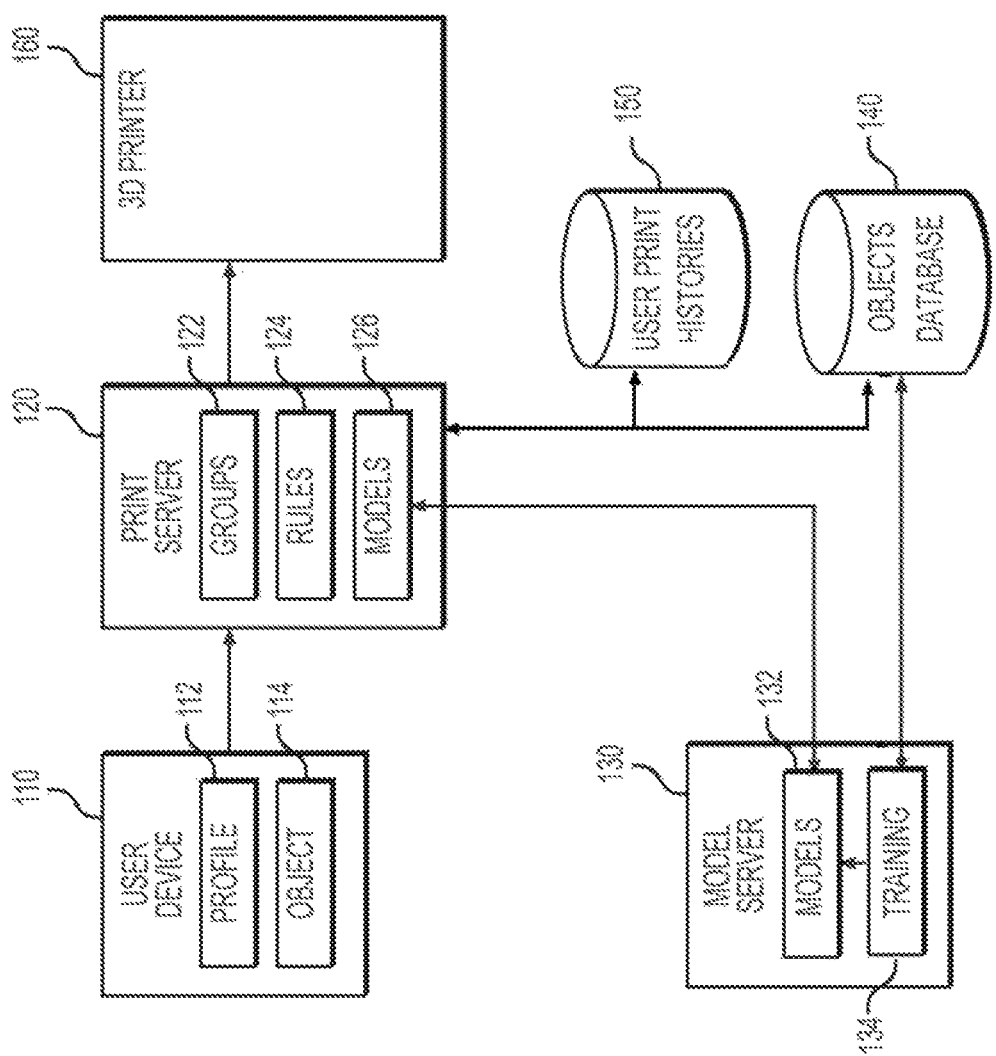
FIG. 1 is an example illustration of system components used for managing 3D printing.

FIG. 1 is an illustration of example system components. In this system, a print server 100 is utilized to route a print request from a user device 110 to a 3D printer 160. The user device 110 can be one or more processor-based devices, such as a personal computer, tablet, or cell phone. The print server 100 can be a single server or a group of servers, including multiple servers implemented virtually across multiple computing platforms. In an example, the print server 100 can be part of a unified endpoint management ("UEM") system. The print server 100 can ensure that printing of the object is allowed. To do this, the print server 120 can execute an agent that reviews an object 114 that is part of the print request from the user device 110. The user device 110 can be associated with a profile 112 that allows the print server 120 to determine which rules 124 apply to the user device 110. The rules 124 can include lists (i.e., whitelists or blacklists) to apply to object classifications. The rules 124 can also include maximum extrusion materials or print times for certain users or organizational groups 122. As will be discussed, models 126, 132 trained by a machine learning engine ("ML engine") 134 can be applied to obtain classifications, which in turn can be compared to the lists.

When the user device 110 requests printing, the object 114 can be sent to the print server 120 as part of a file, as described in more detail below. To determine whether to print the object 114, an agent on the print server 120 can apply one or more models 126 to the object 114 and check one or more rules 124. As will be discussed, models 126 can be trained using machine learning. A first model 126 can be trained to classify objects 114 according to object type. This can indicate what the object 114 is, such as a ball, a spring, a piston, a gun, or any other type of object that could be printed. The rules 124, on the other hand, can indicate attributes and classifications that are allowed or disallowed. For example, the user may only be permitted to use a maximum number of colors or specific colors. The user may also only be able to print certain object types. The rules 124 and models 126 can be maintained and provided to the print server from a management server, which can include a model server 130, in an example.

Some rules 124 may be applicable without a model 126, based on object metadata. Metadata features comparable against rules can include tags for object type, filament use, time to print, and color. In one example, the metadata can include tags for classification (also referred to as categorization). For example, tags can allow users to electronically search for and locate particular types of objects 114. In some examples, tags can be derived from a Uniform Resource Locator (URL), filename, website, or other available indicators. These tags can be retrieved by an agent at the user device 110, print server 120, or even the 3D printer 160. The agent can the compare the tags against the rules 124, which can include a whitelist of allowed object types and a blacklist of disallowed object types. This whitelist or blacklist comparison can be determinative in some cases. For example, a tag that represents a knife can be a direct match with a blacklisted tag for weaponry. This can cause the agent to deny printing, assuming the organization group has disallowed printing of weaponry. However, the metadata itself may not be enough to determine whether to allow the print job.

But in one example, the agent can apply one or more models 126 to the object 114 to determine an object classification. Classifications can indicate object types. A model 126 can return multiple classifications in an example. Then, these classifications can be compared against a list, such as a whitelist or blacklist, to determine whether to print the object 114. The system can allow or block different object types depending on what types of objects the user is allowed to print. For example, printing can be restricted differently based on which organizational group 122 a user device 110 is associated with. A user device 110 in a first organizational group can have different printing privileges that a user device in a second organizational group. For example, an executive group can have no limit on extrusion material but can have a different blacklist of unapproved objects than a secretarial group. A mechanical engineering group likewise can have a more lenient blacklist but can have maximum material quotas. Whereas no group can print a gun, the mechanical engineering group can be allowed to print a piston, in an example.

The user's profile 112 can indicate which lists apply to that user, in an example. This can allow administrators in an UEM system to assign different whitelists of acceptable objects and different blacklists for unacceptable objects, which can be helpful if a particular employee is abusing 3D printing. Likewise, the profile 112 can indicate a group with which the user is associated. This group can then be associated with a list, such as a whitelist that is specific to that group. In this way, the system can ensure users are printing objects 114 that correspond to their job task.

The lists can be set up by an administrator at the management server, in an example. However, machine learning can also update the lists based on manual overrides that occur. In one example, if the model 126 categorizes an object 114 in such a way that it is denied from printing based on a list, the print server 120 can send a notification to the management server. An administrator can review the denied request and override the denial. Override decisions can be stored by the system. An algorithm can analyze the overrides and recognize trends in which object types are commonly allowed even though not present in a whitelist or present in a blacklist. The algorithm can then adjust the appropriate lists, in an example. For example, if a gear is commonly rejected but given override acceptance, a gear classification can be added to a whitelist or removed from a blacklist. These updated lists can then be provided to the print server 120.

The models 126 can exist locally on the print server 120, in an example. For example, these models 126 can be periodically received from the model server 130 as updates to models 132 there occur. Alternatively, the print server 120 can send the object 114 to the model server 130 for comparison with those remote models 132.

In one example, the model 124 can run recognition on the G-code (or corresponding code instructions) of the object 114. It can do this by comparing sections of the G-code to known templates of malicious objects. As an example, the model 124 can check the G-code of the object 114 for certain G-code instructions that are unique to any blacklisted or whitelisted objects. In one example, the unique G-code instructions can be used to analyze the object 114 and increase prediction accuracy in case a print job partially resembles a malicious object.

Models 132 can be built and trained at a model server 130 using machine learning, in an example. For example, the model server 130 can train the model 132 using ML engine 134 based on objects existing in one or more object databases 140. Those objects can contain both shape information and tags that denote object types. In one example, a convolutional neural network is created that outputs similar classifications based on similar shape information.

A history of 3D printing requests for each user can be stored in user print histories 150. The user print histories 150 can be stored on a server, such as printer server 120 or in a network database. The user print histories 150 can be stored as a table that tracks what each user prints. In an example, user print histories 150 can include the object classification of print requests.

When attempting to prevent the printing of certain items, classifying the object 114 alone may be insufficient. For example, if a user sends an object 114 to the print server 120 for printing a pistol, the print server can apply the model 126 to classify the object 114 as a pistol and consequently deny the print request. However, a pistol is made of multiple components, such as a barrel, firing pin, trigger, etc. These components may not get flagged if printed separately such that the model 126 analyzes them in isolation. For this reason, the model 126, or in some examples a second model 126, can be trained to classify combinations of objects. For example, the model 126 can be trained to determine whether the object 114, when combined with previously printed objects, can be combined to create a blacklisted item. In one example, the flags can be stored in the user print histories 150. A trained model 132 can be sent to the print server 120 for use. An object type model 132 can allow the print server 120 to determine what type of object the user is trying to print. Likewise, an object model 132 can allow the agent to flag an object as potentially part of a blacklisted item. In one example, the model classifies part of a blacklisted item that the object 114 could be used for. For example, if the user attempts to print a hollow cylinder similar to a gun barrel shape, the agent or model server 130 can apply the object 114 to the object model 132. In one example, if the geometries of the object 114 meet a threshold similarity to the trained geometries of the model 132, then the model can output a high likelihood that the object 114 could be used as a gun barrel. The agent can then check other printed objects or requests from the user's profile 112, such as the user print histories 150 of the user, to see if the user has requested or printed objects that correspond to other components of a gun. If the number of printed or requested objects exceeds a threshold percentage of a gun, the agent can then reject the print request.

In some examples, the print server 130 can be configured to analyze the requested object 114 to user print histories 150 of other users. In one example, the model server 130 can train a model 132 to identify which user print histories 150 to analyze in combination with the requesting user. For example, the model 132 can link users based on emails, call logs, groups IDs, user geographic locations, and other factors that may associate users with each other. The print server 130 can analyze the user print histories 150 of all users linked to the requesting user to determine if the print request exceeds a threshold amount of a blacklisted item when combined with print requests from the linked users.

In an example, user print histories 150 can be stored in one or more data tables, such as in a relational database. The data tables can include a record of each 3D print request. Each record can include information to help identify potential parts associated with blacklisted items. As an example, the records can include flags indicating that the printed object could be part of a blacklisted or whitelisted item. The record can also indicate which blacklisted item the flag corresponds to. This can allow the print server 130 to identify possible blacklist and whitelist combinations more quickly. For example, the print server 130 can limit its comparison analysis to just objects in the user print histories 150 that have been flagged for the same blacklisted or whitelisted items.

In another example, parts that form a blacklisted or whitelisted item are stored in one or more tables. The print server 120 can check the table to determine whether the classification of the object 112 is in the table. If so, the print server 130 can check the user print history 150 of the user to determine how many parts of the blacklisted item the user has printed. The user print histories 150 of multiple users can be combined in an example in attempt to identify when users are collaborating on printing the parts for a blacklisted object.

User print histories 150 can be backed by a blockchain. This can help prevent administrators from altering or deleting print records. Each blockchain entry can include details about each print job, including metadata extracted by the initial object classification. In one example, the user print histories 150 can be stored as a blockchain that the print server 130 accesses when determining whether to allow a printing request. In another example, the blockchain records can be stored as a backup on a separate storage device. The user print histories 150 can be periodically compared to the blockchain backup to ensure that the user print histories 150 have not been altered.

In an example, if comparison with the rules 124 and models 126 indicates that printing is allowed, the print server 120 can send the object 114 to the 3D printer 160 for printing. The user can be notified at the user device 110 of the print status. The rules 124 (e.g., lists) can also be updated periodically by a model server 130 (or management server), in an example. The lists can evolve, based on feedback from administrative devices, such as denials or acceptances of other print requests. Additionally, an administrative GUI can allow an administrator to define appropriate or inappropriate objects for different organizational groups 122. In one example, the administrator-defined list is used as an offline rule 124 at the print server 120. But based on further machine learning training, the model server 130 can update the list. Then the print server 120 can receive the updated list and use it as a rule 124 for future print decisions.

In another example, the rules 124 and models 126 exist on a 3D printer 160 instead of the print server 120. In that example, the 3D printer 160 can include an agent that performs the comparisons discussed with regard to the print server 120. The agent can also communicate with the model server 130 in the ways explained with regard to the print server 120.

Figure 2:
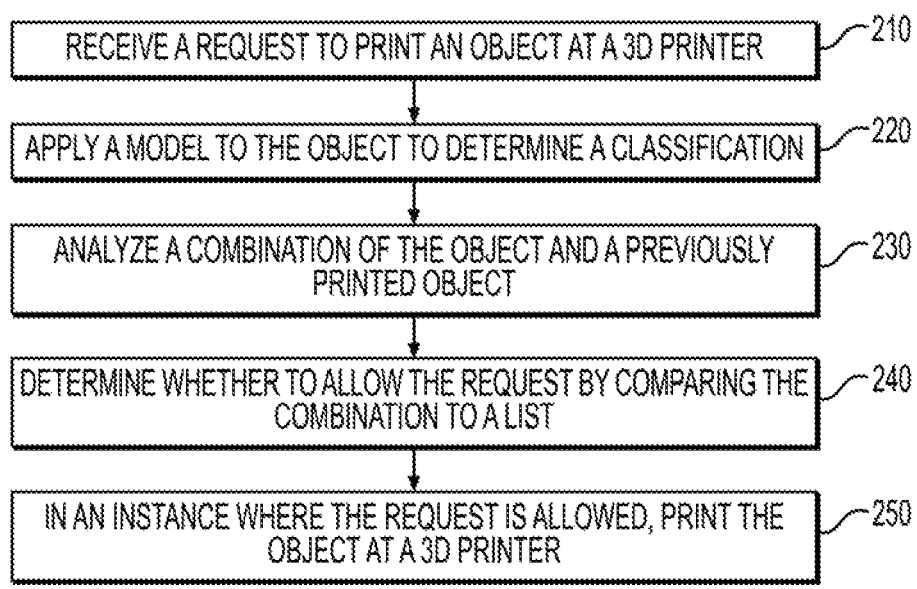
FIG. 2 is a flowchart of an example method for managing 3D printing.

FIG. 2 is an example flow chart for 3D printer management using machine learning. At stage 210, a print server 120 can receive a request to print an object 114 at a 3D printer 160. Alternatively, the request can be sent to the 3D printer 160, in an example. The device that receives the request can execute an agent that performs various checks on the object 114 before carrying out the print job.

The request can include the object 114 in one example. The object 114 can be any file format compatible with a 3D printer 160. For example, the object 114 can be a .3DS, CAD, .OBJ, .GITF, .STL or another file type. The object 114 can include shape information that describes what will be printed. Shape information can include points, vectors, shapes, geometries, sizes, diagrams or any information used to describe dimensions of the object 114. Other metadata can also describe aspects of the object 114. For example, tags can describe categories to which the object 114 belongs. As an example, a first tag for "toy" and a second tag for "spaceship" can apply to an object 114.

At stage 220, the agent can apply a model 126 to the object 114 to determine a classification. The model 126 can be pre-generated based on machine learning. In one example, the model 126 can be a convolutional neural network. The model 126 can classify the object 114 into one of multiple classifications, which can be object type categories. A subset of those classifications can be allowed to print, whereas other categories cause the print request to be blocked.

The classifications can be trained based on tags in object databases 140. For example, a machine learning algorithm of the ML engine 134 can train on databases 140 of CAD files. The CAD files can include tags representing categories. After this training, the model 132 can predict classifications for user-submitted objects 114 based on the shape information and metadata of the object 114. Different models 132 can be trained for different file types, in an example. For example, a CAD file model can differ from an STL file model. The models 132 can be sent to the print server 120 or 3D printer 160 for local use (i.e., as a local model 126), in an example. The agent can apply the model 126 to the object 114 locally or by sending the object to a model server 130. In one example, the model outputs at least one classification.

At stage 230, the agent can analyze a combination of the object 114 and a previously printed object. In an example, the agent can analyze the object 114 in combination with previous print requests from the profile 112. This analysis can determine whether the combination of the object 114 and another previously printed object are components of a blacklisted item. In one example, the analysis can include the agent applying the model 126, or another separate model, to the objects.

Applying the model 126 to all object combinations on every print request can become time consuming and may strain computing resources as the number of objects involved increases. To prevent this, in some examples the model 126 can flag objects 114 that could make up part of a blacklisted object. The flag can indicate what blacklisted object the object 114 could be used to make. When a new print request is received, the model 126 can apply one or more flags with each flag indicating a blacklisted object that the object 114 could be used to make. The model 126 can then compare the object 114 only with objects that have flags corresponding to the same blacklisted item or items. In one example, the model server ML engine 134 can periodically re-analyze all objects in the object database 140 to ensure that the flags are up to date based on new blacklisted items and improved object recognition. In another example, the model 126 can flag the object 114 as an object that could be used as a component of a blacklisted item, and the agent can compare the object 114 to previously printed objects flagged for the same blacklisted item.

At stage 240, the agent can determine whether to allow the print request based on a comparison of the object combination to a list. For example, the agent can deny a print request where the combination of the object 114 and another previously printed object can be combined to create a blacklisted item. In some examples, a printing request can be denied if the combination of the object 114 and one or more previous 3D printing requests amounts to a predetermined threshold amount of a blacklisted object. Such a threshold can be set by an administrator. For example, an administrator can configure the printer server 120 to reject a 3D printing request if the model 126 determines that the combination of objects amounts to 50% or more of a blacklisted object. Any request that exceeds the threshold can be sent to the administrator for review. The administrator can then determine whether the request denial can be manually overridden or if additional security measures need to be taken.

The allowable threshold can vary according to the object. For example, the print server 130 can allow a lower threshold for simpler objects like knives and allow a higher threshold for more complicated objects like guns. In another example, the print server 130 can prohibit users from printing certain combinations of blacklisted items regardless of the threshold percentage. For example, a user can be prohibited from printing a trigger mechanism and a bullet chamber of gun even though that combination amounts to less than the prohibited threshold. In another example, blacklisted objects can be categorized, and each category can be assigned a different threshold. As an example, blacklisted weapons can be allowed a lower threshold than toys.

The print server 130 can be configured to allow threshold leniencies when whitelisted objects are involved in an object comparison. This can help ensure the system does not overreact and block work-related items from being printed. In one example, the print server 130 can ignore all 3D printed objects that are whitelisted when determining a threshold combination of a blacklisted item. As an example, a user sends a 3D print request of object 114 to the print server 130. The print server 130 determines that a combination of the object 114 and previously printed objects in the user print histories 150 amounts to more than an allow threshold percentage of a blacklisted item. However, one of the previously printed objects in the combination is a whitelisted item, and if that item is removed from the combination the percentage drops below the threshold. In this case, the print server 130 can allow the request. In some examples, the print server 130 can assign a reduced percentage for whitelisted items. As an example, whitelisted items can count for 50% of what they would normally count for.

In an example, the object 114 can be analyzed in combination with previously printed objects of other users. This can help prevent a user or group of users from printing blacklisted objects using different profiles. In an example, the model server 130 can train a model 132 to link users based on analysis of various sources, such as emails, call logs, user geographic locations, and group IDs. The print server 130 can analyze the object 114 in combination with objects in the user print histories 150 of all users linked to the requesting user.

In an instance where the request is allowed, the 3D printer 160 can print the object 114 at stage 250. For example, the print server 120 can send the object 114 with a print instruction to the appropriate printer 160. However, in some instances the print request can be denied at stage 250. However, the denial can be sent to both the user who submitted the request and a supervisor, in an example. The supervisor can override the denial in an example, which can cause the 3D printer to print the object at stage 250. The override can reroute the print request in one example. The rerouted request can include, for example, a key generated based on the administrative approval that is compared against a key stored in a backend system. The model server 130 can take such reversals of denial into account in training the model to allow such items in the future. Likewise, new lists for offline use can be generated by the model server. In some examples, an override can be accompanied by an indication from the supervisor whether the override is applicable to only the present print request or also to future requests. In those examples, additional training based on the override will only be performed where the supervisor indicates the reversal is applicable to future requests.

In one example of the previously described method, a user sends a print request to the print server 120 to print a first object 114 on the 3D printer 160. In this example, the first object 114 is a cylindrical shape that resembles the barrel of a gun. The printing agent can apply the model 126 to the first object 114, which classifies it as a hollow cylinder. Because a hollow cylinder can have numerous allowable uses, the model 126 does not reject the printing request based on the first object's 114 classification alone. However, the model 126 recognizes that the first object 114 can make up part of a gun, which is a blacklisted item, and flag it accordingly. Later, the user sends a print request for a second object 114. The model 126 determines that the classification of the second object 114 can constitute a handle of a gun and flag it accordingly. The model 126 then analyzes the first and second objects 114 in combination and determines that they can constitute more than 50% of a gun. The print server 120 denies the print request and notifies an administrator.

Figure 3:
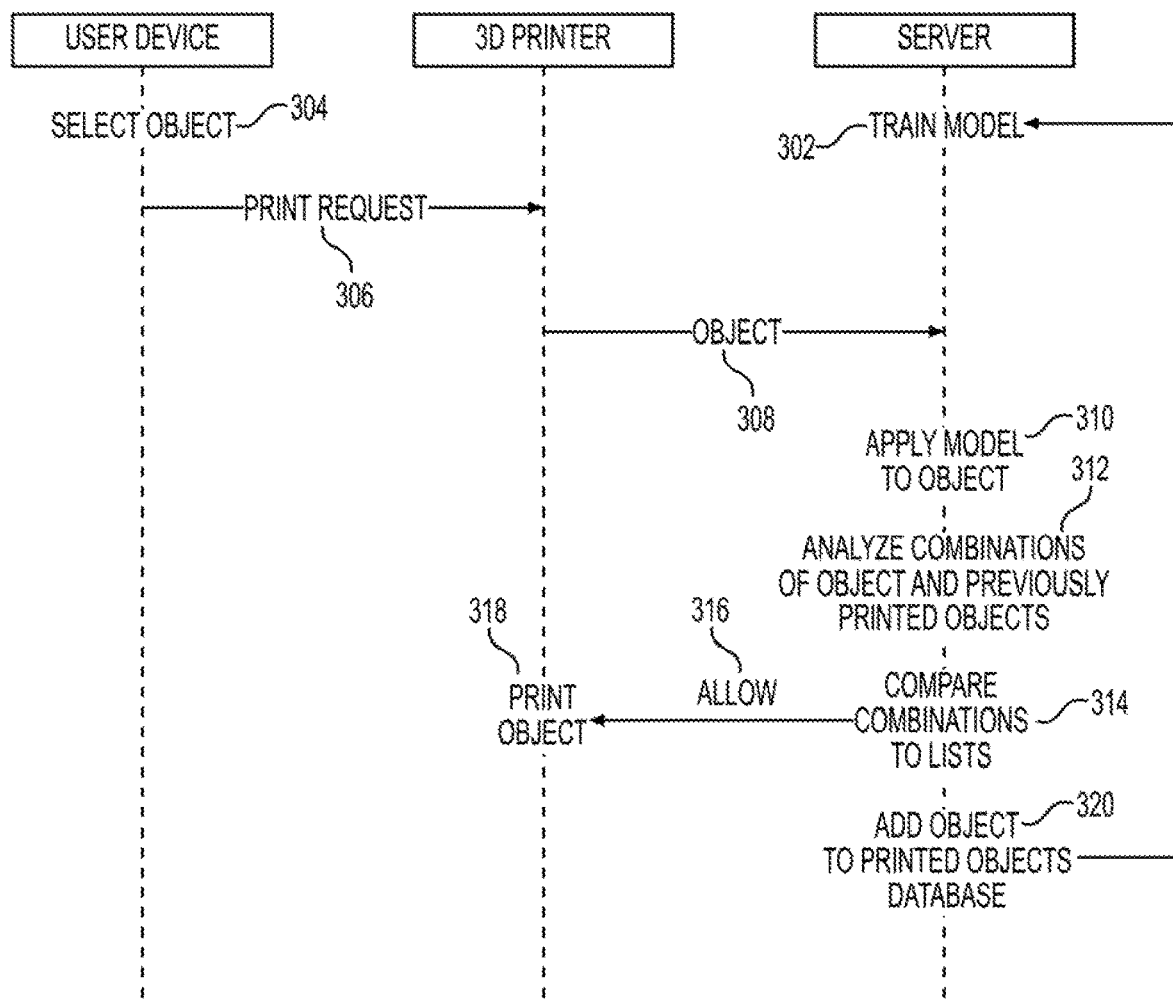
FIG. 3 is an example illustration of a sequence diagram for managing 3D printing.
Figure 4:
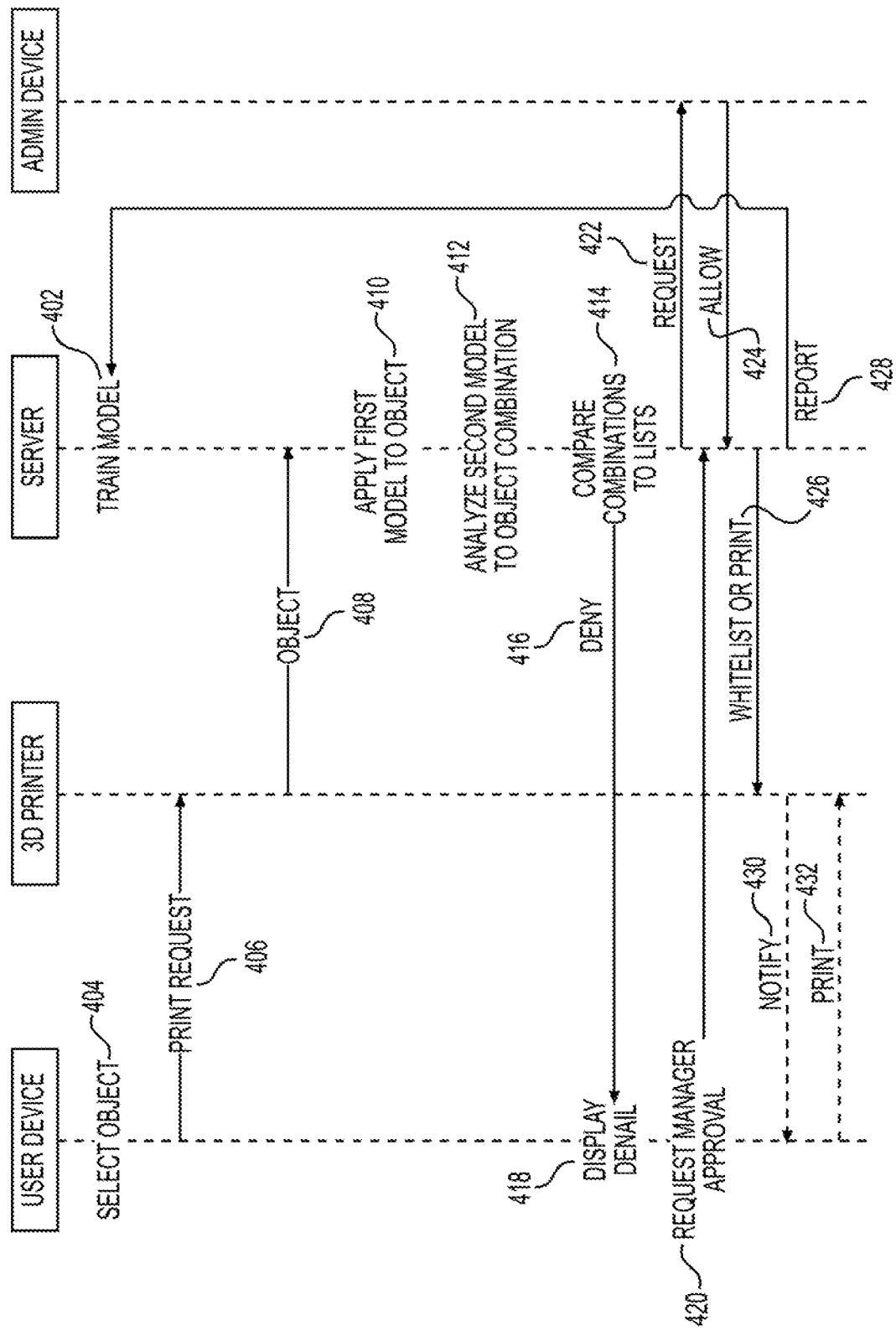
FIG. 4 is an example illustration of a sequence diagram for managing 3D printing.

FIGS. 3 and 4 are example sequence diagrams for managing printing of 3D objects 114 by using machine learning. FIG. 3 includes printing to a 3D printer without the involvement of a separate admin device, whereas FIG. 4 implements an admin device.

Turning to FIG. 3, at stage 302, a server can train a model 132 using ML engine 134, for example. This can include running one or more machine learning algorithms against a database of existing objects, such as object database 140. The existing objects can include metadata with tags that are used to classify those objects, for example, for location via search by a user. The training can therefore result in a model 132 that outputs object classifications based on object 114 shape information and metadata.

The server can be a model server 130 in an example. It can also be a management server that manages user profiles, organizational groups, and performs UEM tasks. In one example, the model server 130 is part of the management server. In some examples, a model 132 can be trained on a model server 130 and sent to a print server 120 to perform the remaining server stages.

At stage 304, a user can select an object 114 to print. The selection can occur on the user device, which can execute a client for 3D printing. The user can select an option to print at stage 306, causing the object 114 to be sent to a 3D printer. In one example, the 3D printer can be configured to send the object 114 to the server for approval at stage 308. Alternatively, when a user selects an option to print at stage 306, the user device can send the object directly to the server.

At stage 310, the server can apply a model 132 to the object 114. The model 132 can output a classification for the object 114. The classification can be compared against a list to accept or reject the print request. In one example, the list can be a whitelist or blacklist. If the server does not reject the object 114 at stage 310, the server can apply the model 132, or a second model, to a combination of the object 114 and previously printed objects at stage 312. In an example, the model can analyze the object 114 in combination all previous print requests from the same user, such as the profile 112.

At stage 314, the server can compare the analyzed combination to one or more lists to determine whether to allow the printing request. In one example, the lists can be the same whitelist and blacklist described above. In another example, the server can determine whether any combination amounts to more than a threshold percentage of a blacklisted item. For example, if a UEM allows up to 60% of a blacklisted item to be printed, any combinations amounting to 60% or less would be allowed, and likewise any combinations amounting to more than 60% would be denied. In another example, certain combinations of components of a blacklisted item can be prohibited regardless of the threshold percentage. As an example, a UEM can prohibit users from printing 60% of a gun. The UEM can also prohibit users from printing a chamber and a barrel of a gun. If the chamber and barrel components amount to less than 60% of a gun, a print request can still be denied if a user has previously printed one of the two components and later requests to print the other.

In one example, at stage 310 the model 132 can recognize the object 114 as a possible component of a blacklisted item. Then, at stage 312, the model 132 can apply a flag to the object 114 identifying the blacklisted item and a component of the blacklisted item that the object 114 corresponds to. Then at stage 312, the model 132 can analyze the object 114 in combination with any previously printed objects flagged for the same blacklisted item. At stage 314, the server can compare the combination to a blacklist. If the combination of the object 114 and any previously printed objects amounts to more than a certain threshold amount of a blacklisted item, the server can deny the printing request.

In this example, at stage 316 the print request can be allowed based on neither the object 114 itself nor any object combination amounting to a threshold amount of a blacklisted item. In one example, the server can send the object 114 to the 3D printer to be printed at stage 318. In another example where the 3D printer already has the object 114, the server can merely send instructions to print the object 114.

At stage 320 the server can add the object 114 to a printed object database. For example, the server can send the object 114 to the object database 140. The object 114 can then be used to retrain the model 132. For example, the object 114 and its metadata can be reported to the training algorithm at stage 320. This can allow the training to take the object 114 into account when creating models 132.

As an example, a user sends a request to print the object 114, and at stage 310 the model 132 recognizes the object 114 as a possible component of a blacklisted item. The model 132 applies a flag to the object 114 identifying the blacklisted item and a component of the blacklisted item that the object 114 corresponds to. Even though the object 114 could be used as part of a blacklisted item, at stage 312 the model 132 determined that no combination of the object 114 and any previously printed objects amounts to more than a predetermined threshold of the blacklisted item. The server then allows the 3D printer to print the object 114. The ML engine 134 uses the comparison information, including the flag, to retrain the model 132. At a later time, the user sends a request to print another object, and at stage 312 the newly trained model 132 determines that the newly requested object, when combined with the object 114 and possibly additional objects previously printed, amounts to more than the predetermined threshold amount of a blacklisted item. The server denies the new print request and notifies an administrator.

Turning to FIG. 4, at stage 402, a server can train a model 132 using ML engine 134, for example. This can include running one or more machine learning algorithms against an objects database 140 of existing objects. The existing objects can include metadata with tags that are used to classify those objects, for example, for location via search by a user. The training can therefore result in a model 132 that outputs object classifications based on object 114 shape information and metadata.

The server can be a model server 130 in an example. It can also be a management server that manages user profiles, organizational groups, and performs UEM tasks. In one example, the model server 130 is part of the management server.

At stage 404, a user can select an object 114 to print. The selection can occur on the user device, which can execute a client for 3D printing. The user can select an option to print at stage 406, causing the object 114 to be sent to a 3D printer. In one example, the 3D printer can be configured to send the object 114 to the server for approval at stage 408. Alternatively, when a user selects an option to print at stage 406, the user device can send the object directly to the server.

At stage 410, the server can apply a model 132 to the object 114. The model 132 can output a classification for the object 114. The classification can be compared against a list to accept or reject the print request. In one example, the list can be a whitelist or blacklist. If the server does not reject the object 114 at stage 410, the server can apply the model 132, or a second model, to a combination of the object 114 and previously printed objects at stage 412. In an example, the model can analyze the object 114 in combination with all previous print requests from the same user, such as the profile 112.

At stage 414, the server can compare the analyzed combination to one or more lists to determine whether to allow the printing request. In one example, the lists can be the same whitelist and blacklist described above. In a second example, the server can determine whether any combination amounts to more than a threshold percentage of a blacklisted item. In a third example, the server can prohibit certain combinations of components of a blacklisted item regardless of the threshold percentage.

In an example, at stage 410 the model 132 can recognize the object 114 as a possible component of a blacklisted item. The model 132 can apply a flag to the object 114 identifying the blacklisted item and a component of the blacklisted item that the object 114 corresponds to. Then at stage 412, the model 132 can analyze the object 114 in combination with any previously printed objects flagged for the same blacklisted item. Then at stage 414, the server can compare the combination to blacklisted items. If the combination of the object 114 and any previously printed objects amounts to more than a certain threshold amount of a blacklisted item, the server can deny the printing request at stage 416.

In this example, at stage 416 the print request is denied based on the object combination. The denial can be sent to user device 110 (either by the server or the 3D printer). The user device 110 can then display the denial at stage 418. The denial can also be reported to an administrator device, in an example. This can allow an administrator to know if users are attempting to print prohibited objects.

The denial can also prevent the user from printing other objects, in an example. This can mitigate against a user making slight modifications to a denied object in order to gain approval, and it can require administrative intervention in an example. An agent on the user device can disable printing to a 3D printer in an example. Alternatively, the server can block all 3D print requests for the user by storing user information in association with the block. In an example where a global block is applied to the user based on the denied print request, the server can notify the administrator device of the denial and prompt whether the block should be lifted without the user specifically requesting it. For example, if the denial causes the server to block all future print requests for 3D objects by the user, the server can send a request at stage 422 that can allow the administrator to lift the block at stage 424.

In one example, the user can then request managerial approval for printing the object 114 at stage 420. The managerial approval can also be sought for reenabling print capabilities for 3D objects after the user has been blocked. When received, this override request can be sent to a server, which can forward the request to the appropriate administrator device at stage 422. In some examples, an administrator device is selected based on the nature of the print denial. For instance, a denial based on a lack of available material or a blacklisted object can be sent to an office manager, an executive, or a member of a legal team, respectively. The administrator can allow the print request at stage 424. The server can then instruct the 3D printer to print the object 114 at stage 426.

The override can be reported to the training algorithm at stage 428, in an example. This can allow the training to take overrides into account when creating models 132. In one example, the server can update a whitelist based on the override. The user can also receive notice of the override at stage 430. Requesting the 3D printer to print the same object 114 again, therefore, can result in printing at stage 432.

In some examples, instead of denying the print request at stage 416, the print server 120 can modify the uncompliant object 114 for printing in a way that makes it unlikely to be useable in a noncompliant manner. As an example, if the object 114 is classified as a trigger for a gun, the print server 120 can modify the object 114 to cause it to be printed some percentage larger than specified by the design (e.g., 25% larger). This may prevent the user from being able to use the printed object in combination with the other objects previously printed because it would not fit. The change in size can be random or predetermined. In another example, the print server 120 can add or remove portions of material to the object as it prints so that it could not be used for its noncompliant purpose.

Figure 5:
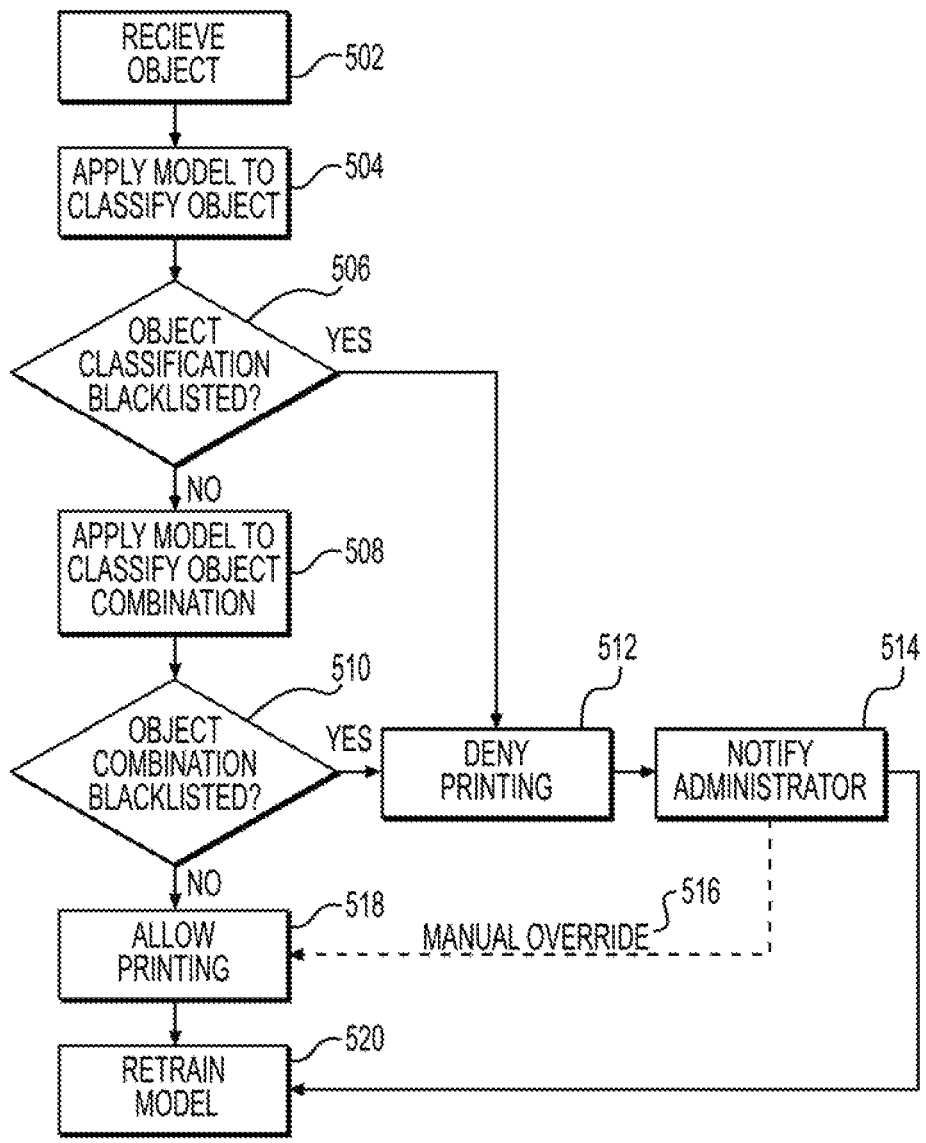
FIG. 5 is a flowchart of an example method for managing 3D printing.

FIG. 5 is a flowchart of an example method for managing 3D printing. At stage 502, the print server 120 can receive the object 114. The object 114 can be received as part of a request from the user device 110 to print the object 114. After receiving the object 114, the server can apply the model 126 at stage 504. The model 126 can output a classification for the object 114.

At stage 506, the print server 120 can compare the object classification against a blacklist that includes items that are banned from being printed. If the object 114 amounts to all, or at least a predetermined threshold amount, of a blacklisted item, then at stage 512 the print server 120 can deny the printing request at stage 512. In one example, the print server 120 can also block the user from printing any objects on a 3D printer until an administrator restores the user's printing rights.

The print server 120 can notify an administrator of the denied request at stage 514. The administrator can then review the print request and determine any action that should be taken. For example, at stage 516 the administrator can manually override the printing denial so that the object 114 can be printed at stage 518.

Returning to stage 506, if the classification of object 114 does not correspond to a blacklisted item, at stage 508 the print server 120 can apply the model 126 to compare the object 114 to previously printed objects. In one example, the model 126 can compare the object 114 to objects previously printed by the user. In another example, at stage 506 the model 126 can recognize the object 114 as a possible component of a blacklisted item. The model 126 can apply a flag to the object 114 identifying the blacklisted item and a component of the blacklisted item that the object 114 corresponds to. The model 126 can compare the object 114 to any previously printed objects flagged for the same blacklisted item.

At stage 510, the print server 120 can determine whether any combination of the object 114 and the previously printed objects amounts to a blacklisted item. In one example, the determination can be based on whether the combination is greater than a predetermined threshold amount of a blacklisted item. If so, the method can proceed to stages 512 and 514 where the printing request is denied and an administrator is notified. However, if no combination amounts to the threshold amount of a blacklisted item, then the print server 120 can allow the object 114 to be printed at stage 518. In an example, this can include sending instructions to the 3D printer 130 to print the object 114.

At stage 520, the model 126 can be retrained. As an example, the print server 120 can send the object 114 and any related information, such as metadata and flags, to the model server 130. The ML engine 134 can then retrain the model 126 with the new information. Retraining the model 126 can include associating the object 114 with the user profile so that it can be used for future print requests from the user to determine if the user may be attempting to separately print components of a blacklisted item.

In some examples, the model 126 can be retrained after a print request is denied. In one example, the model 126 can be retrained after notifying the administrator at stage 514. Alternatively, the model can be retrained after a printing request is denied at stage 512 even if an administrator is not notified.

In one example of the previously described method, the model 126 flags the object 114 at stage 504 as a potential component of a blacklisted item. However, the print server 130 allows the object 114 to be printed because it does not amount to blacklisted item by itself or in combination with previously printed objects. At stage 520 the model 126 is retrained to recognize the object 114 as part of a blacklisted item so that it can analyzed in combination with future print requests at stage 508. At a later time, the print server 120 receives a request to print another object. This object also passes the model application at stage 504 because its classification is not a blacklisted item. However, at stage 508, the model 126 determines that the new object and the object 114 can both be classified or used as components of a blacklisted item. For example, the object 114 can be classified as a gun barrel and the new object can be classified as a gun handle. The model can also incorporate other previously printed objects. For example, the model can determine that the user has also printed objects that can be classified a firing pin and a trigger. The model then determines that the percentage of components for the blacklisted item that have been requested or printed by the user, including the newly requested object, amounts to more than the allowed threshold. For example, the model can determine that all previously printed objects that were flagged as potential gun components, when combined with the new object, amount to 75% of a gun when the allowable limit is 55%. The print server 120 then denies the new print request at stage 512 and notifies an administrator. In some examples, the print server 120 can take additional actions, such as blocking the user from printing. In one example, the print server 120 can communicate with a management server to lock the user out of a UEM system entirely.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for 3D printing management, comprising:
   receiving, at a print server, a request to print a first object at a 3D printer, the request being associated with a first user profile and including an object data file of the first object, the first user profile being associated with a group identifier;
   applying a first model to the object data file, wherein the first model outputs a first classification of the first object based on shape information of the first object;
   predicting, based on the first classification, that the first object is a first component of a blacklisted item;
   applying a second model to the first object using a data table with a print history of user profiles associated with the group identifier, wherein the second model outputs a second object that is a second component of the blacklisted item, the second object having been previously printed using a user profile associated with the group identifier other than the first user profile;

determining that the second object is a whitelisted item;

based on the determination that the second object is a whitelisted item, reducing a percentage that the second object counts toward the threshold amount of the blacklisted item by a predetermined amount;

determining whether a combination of the first object and the second object represents more than a threshold amount of the blacklisted item;

denying the request to print the first object if the combination of the first object and the second object represents more than a threshold amount of the blacklisted item; and allowing the request to print the first object if the combination of the first object and the second object does not represent more than a threshold amount of the blacklisted item.

2. The method of claim 1, wherein applying the second model to the first object includes using a data table with a print history of a second user profile, wherein the second user profile is linked to the first user profile based on shared communications between the first user profile and the second user profile.

3. The method of claim 1, wherein:
applying the first model includes applying a tag to the first object based on a determined classification, the tag corresponding to the blacklisted item, and
applying the second model includes determining that the second object also includes the tag and determining an amount of the blacklisted item that the combination of the first object and the second object represents.

4. The method of claim 1, wherein a print history of the first user profile is stored in the data table, wherein the print history includes a history of objects printed using the first user profile.

5. The method of claim 4, further comprising comparing the data table to a blockchain record of user print histories to verify that no records have been removed from the table.

6. The method of claim 1, further comprising sending an alert to an administrator that identifies the combination of objects used to deny the request.

7. The method of claim 1, wherein:
the first model and the second model are trained using machine learning; and
the method further comprises:
retraining at least the first model or the second model based on a determination whether a combination of the first object and the second object represents more than a threshold amount of the blacklisted item.

8. A non-transitory, computer-readable medium containing instructions that, when executed by a hardware-based processor, performs stages for 3D printing management, the stages comprising:
receiving, at a print server, a request to print a first object at a 3D printer, the request being associated with a first user profile and including an object data file of the first object, the first user profile being associated with a group identifier;
applying a first model to the object data file, wherein the first model outputs a first classification of the first object based on shape information of the first object;
predicting, based on the first classification, that the first object is a first component of a blacklisted item;
applying a second model to the first object using a data table with a print history of user profiles associated with the group identifier, wherein the second model outputs a second object that is a second component of the blacklisted item, the second object having been previously printed using a user profile associated with the group identifier other than the first user profile;

determining that the second object is a whitelisted item;

based on the determination that the second object is a whitelisted item, reducing a percentage that the second object counts toward the threshold amount of the blacklisted item by a predetermined amount;

determining whether a combination of the first object and the second object represents more than a threshold amount of the blacklisted item;

denying the request to print the first object if the combination of the first object and the second object represents more than a threshold amount of the blacklisted item; and allowing the request to print the first object if the combination of the first object and the second object does not represent more than a threshold amount of the blacklisted item.

9. The non-transitory, computer-readable medium of claim 8, wherein applying the second model to the first object includes using a data table with a print history of a second profile, the second profile being linked to the first user profile based on shared communications between the first user profile and the second user profile.

10. The non-transitory, computer-readable medium of claim 8, wherein:
applying the first model includes applying a tag to the first object based on a determined classification, the tag corresponding to the blacklisted item, and
applying the second model includes determining that the second object also includes the tag and determining an amount of the blacklisted item that the combination of the first object and the second object represents.

11. The non-transitory, computer-readable medium of claim 8, wherein the print history of the first user profile is stored in data table, wherein the print history includes a history of objects printed using the first user profile.

12. The non-transitory, computer-readable medium of claim 11, the stages further comprising comparing the data table to a blockchain record of user print histories to verify that no records have been removed from the table.

13. The non-transitory, computer-readable medium of claim 8, the stages further comprising sending an alert to an administrator that identifies the combination of objects used to deny the request.

14. The non-transitory, computer-readable medium of claim 8, wherein:
the first model and the second model are trained using machine learning; and
the stages further comprise:
retraining at least the first model or the second model based on a determination whether a combination of the first object and the second object represents more than a threshold amount of the blacklisted item.

15. A system for 3D printing management, comprising:
a memory storage including a non-transitory, computer-readable medium comprising instructions; and
a computing device including a hardware-based processor that executes the instructions to carry out stages comprising:
receiving, at a print, a request to print a first object at a 3D printer, the request being associated with a first user profile and including an object data file of the first object, the first user profile being associated with a group identifier;

applying a first model to the object data file, wherein the first model outputs a first classification of the first object based on shape information of the first object;

predicting, based on the first classification, that the first object is a first component of a blacklisted item;

applying a second model to the first object using a data table with a print history of user profiles associated with the group identifier, wherein the second model outputs a second object that is a second component of the blacklisted item, the second object having been previously printed using a user profile associated with the group identifier other than the first user profile;

determining that the second object is a whitelisted item;

based on the determination that the second object is a whitelisted item, reducing a percentage that the second object counts toward the threshold amount of the blacklisted item by a predetermined amount;

determining whether a combination of the first object and the second object represents more than a threshold amount of the blacklisted item;

denying the request to print the first object if the combination of the first object and the second object represents more than a threshold amount of the blacklisted item; and allowing the request to print the first object if the combination of the first object and the second object does not represent more than a threshold amount of the blacklisted item.

16. The system of claim 15, wherein applying the second model to the first object includes using a data table with a print history of a second profile linked to the first user profile based on shared communications between the first user profile and the second user profile.

17. The system of claim 15, wherein:
applying the first model includes applying a tag to the first object based on a determined classification, the tag corresponding to the blacklisted item, and
applying the second model includes determining that the second object also includes the tag and determining an amount of the blacklisted item that the combination of the first object and the second object represents.

18. The system of claim 15, wherein a print history of the first user profile is stored in the data table, wherein the print history includes a history of objects printed using the first user profile, and the stages further comprise comparing the data table to a blockchain record of user print histories to verify that no records have been removed from the table.

19. The system of claim 15, the stages further comprising sending an alert to an administrator that identifies the combination of objects used to deny the request.

20. The system of claim 15, wherein:
the first model and the second model are trained using machine learning; and
the stages further comprise:
retraining at least the first model or the second model based on a determination whether a combination of the first object and the second object represents more than a threshold amount of the blacklisted item.

* * * * *